(12) United States Patent
Hambridge et al.

(10) Patent No.: US 10,142,162 B2
(45) Date of Patent: Nov. 27, 2018

(54) MOBILE APPLICATION BEHAVIOR MODIFICATION VIA CONTEXT SENSITIVE ISSUE FRAMEWORK

(71) Applicant: International Business Machines Corporation, Armonk, NY (US)

(72) Inventors: Christopher A. Hambridge, Raleigh, NC (US); Kevan D. Holdaway, Apex, NC (US); Wuchieh J. Jong, Raleigh, NC (US); Dillon D. Lees, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 15/241,198

(22) Filed: Aug. 19, 2016

(65) Prior Publication Data
US 2018/0054346 A1    Feb. 22, 2018

(51) Int. Cl.
| G06F 15/16 | (2006.01) |
| H04L 12/24 | (2006.01) |
| H04W 4/20 | (2018.01) |
| H04L 29/08 | (2006.01) |

(52) U.S. Cl.
CPC .......... *H04L 41/048* (2013.01); *H04L 67/327* (2013.01); *H04W 4/20* (2013.01)

(58) Field of Classification Search
CPC . H04L 41/048; H04L 67/327; H04L 47/2475; H04W 4/20

USPC ........................................................ 709/202
See application file for complete search history.

(56) References Cited

U.S. PATENT DOCUMENTS

| 7,353,016 | B2 | 4/2008 | Roundtree et al. |
| 7,917,815 | B2 | 3/2011 | Rapp et al. |
| 8,429,454 | B2 | 4/2013 | Yuan et al. |
| 8,510,597 | B2 | 8/2013 | Swift et al. |
| 8,533,704 | B2 | 9/2013 | Wookey |
| 8,914,018 | B2 | 12/2014 | Tatman et al. |
| 2007/0112574 | A1* | 5/2007 | Greene .................. G06F 9/5072 340/572.1 |
| 2008/0274716 | A1 | 11/2008 | Fok et al. |
| 2014/0082513 | A1 | 3/2014 | Mills et al. |
| 2014/0215312 | A1 | 7/2014 | Hicks et al. |
| 2014/0304409 | A1 | 10/2014 | Kamath et al. |
| 2015/0098393 | A1* | 4/2015 | Tofighbakhsh ....... H04W 24/02 370/329 |

\* cited by examiner

*Primary Examiner* — Kristie D Shingles
(74) *Attorney, Agent, or Firm* — Yee & Associates, P.C.; Maeve Carpenter (57) ABSTRACT

Modifying a behavior of a mobile application running on a mobile data processing system is provided. Information regarding a system function of the mobile data processing system is retrieved. It is determined whether the information regarding the system function meets a criterion of a policy trigger corresponding to the system function. In response to determining that the information regarding the system function does meet a criterion of the policy trigger corresponding to the system function, an action is performed to modify the behavior of the mobile application running on the mobile data processing system that corresponds to the system function meeting the criterion of the policy trigger.

19 Claims, 6 Drawing Sheets

MOBILE APPLICATION BEHAVIOR MODIFICATION VIA CONTEXT SENSITIVE ISSUE FRAMEWORK

BACKGROUND

1. Field

The disclosure relates generally to mobile applications and more specifically to modifying a behavior of a mobile application running on a mobile device using an event handler that receives relevant context-based and threshold-based event trigger notifications from a corresponding agent running on the mobile device.

2. Description of the Related Art

Mobile applications, also known as mobile apps, is a term used to describe applications that run on mobile devices, such as, for example, smart phones and handheld computers. Mobile applications frequently serve to provide users with similar functions as those accessed on personal or desktop computers. Typically, mobile applications are small, individual software units with limited functionality. For example, each mobile application on a mobile device may provide different functionality, such as, for example, a game, a calculator, a personal calendar, an exercise monitor, a mobile Web browser, and the like. Although these mobile applications may have avoided multitasking because of limited hardware resources of early mobile devices, their specificity is now part of their desirability because they allow users to select what their mobile devices are able to do.

SUMMARY

According to one illustrative embodiment, a computer-implemented method for modifying a behavior of a mobile application running on a mobile data processing system is provided. The mobile data processing system retrieves information regarding a system function of the mobile data processing system. The mobile data processing system determines whether the information regarding the system function meets a criterion of a policy trigger corresponding to the system function. In response to the mobile data processing system determining that the information regarding the system function does meet a criterion of the policy trigger corresponding to the system function, the mobile data processing system performs an action to modify the behavior of the mobile application running on the mobile data processing system that corresponds to the system function meeting the criterion of the policy trigger. According to other illustrative embodiments, a mobile data processing system and computer program product for modifying a behavior of a mobile application running on the mobile data processing system are provided.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

Figure 1:
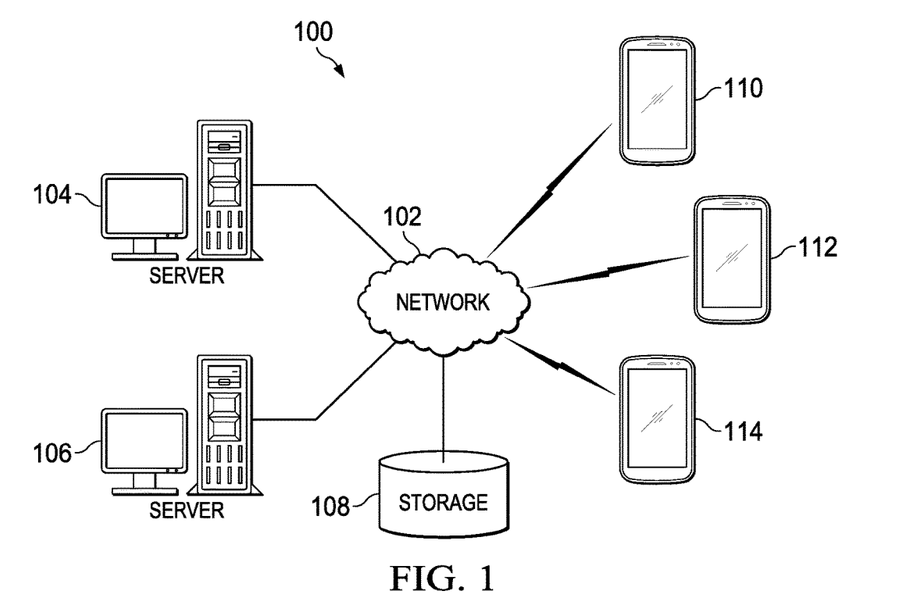
FIG. 1 is a pictorial representation of a network of data processing systems in which illustrative embodiments may be implemented.

FIG. 1 depicts a pictorial representation of a network of data processing systems in which illustrative embodiments may be implemented. Network data processing system 100 is a network of computers, mobile data processing systems, and other devices in which the illustrative embodiments may be implemented. Network data processing system 100 contains network 102, which is the medium used to provide communications links between the computers, mobile data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more services to users of client devices connected to network 102. For example, server 104 and server 106 may provide online gaming services, text messaging services, voice communications services, data retrieval services, and the like, to client devices. Also, it should be noted that server 104 and server 106 may represent a plurality of different servers providing a plurality of different services to network 102 client device users.

Client 110, client 112, and client 114 also connect to network 102. Clients 110, 112, and 114 are clients of server 104 and server 106. Further, server 104 and server 106 may provide information, such as boot files, operating system images, and software applications to clients 110, 112, and 114.

In this example, clients 110, 112, and 114 are illustrated as mobile data processing systems with wireless communication links to network 102. The mobile data processing systems may be, for example, smart phones, cellular phones, smart watches, personal digital assistants, handheld computers, gaming devices, and the like.

Users of clients 110, 112, and 114 may utilize clients 110, 112, and 114 to access the set of services provided by server 104 and server 106. In addition, clients 110, 112, and 114 may send information regarding different software components of clients 110, 112, and 114 to server 104 and server 106 for monitoring and analysis.

Storage 108 is a network storage device capable of storing any type of data in a structured format or an unstructured format. In addition, storage 108 may represent a set of one or more network storage devices. Storage 108 may store, for example, names and identification numbers for a plurality of different mobile device users; identification of a plurality of different mobile devices corresponding to the different users; and user profiles, which may contain information, such as particular type and serial number of a mobile device used by a particular user, type of mobile operating system installed on the mobile device, number and types of mobile applications installed by the user on the mobile device, a plurality of different software agents, and the like. Further, storage 108 may store other data, such as authentication or credential data that may include user names, passwords, and biometric data associated with the plurality of different mobile device users.

In addition, it should be noted that network data processing system 100 may include any number of additional server devices, mobile client devices, and other devices not shown. Program code located in network data processing system 100 may be stored on a computer readable storage medium and downloaded to a computer or mobile data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

Figure 2:
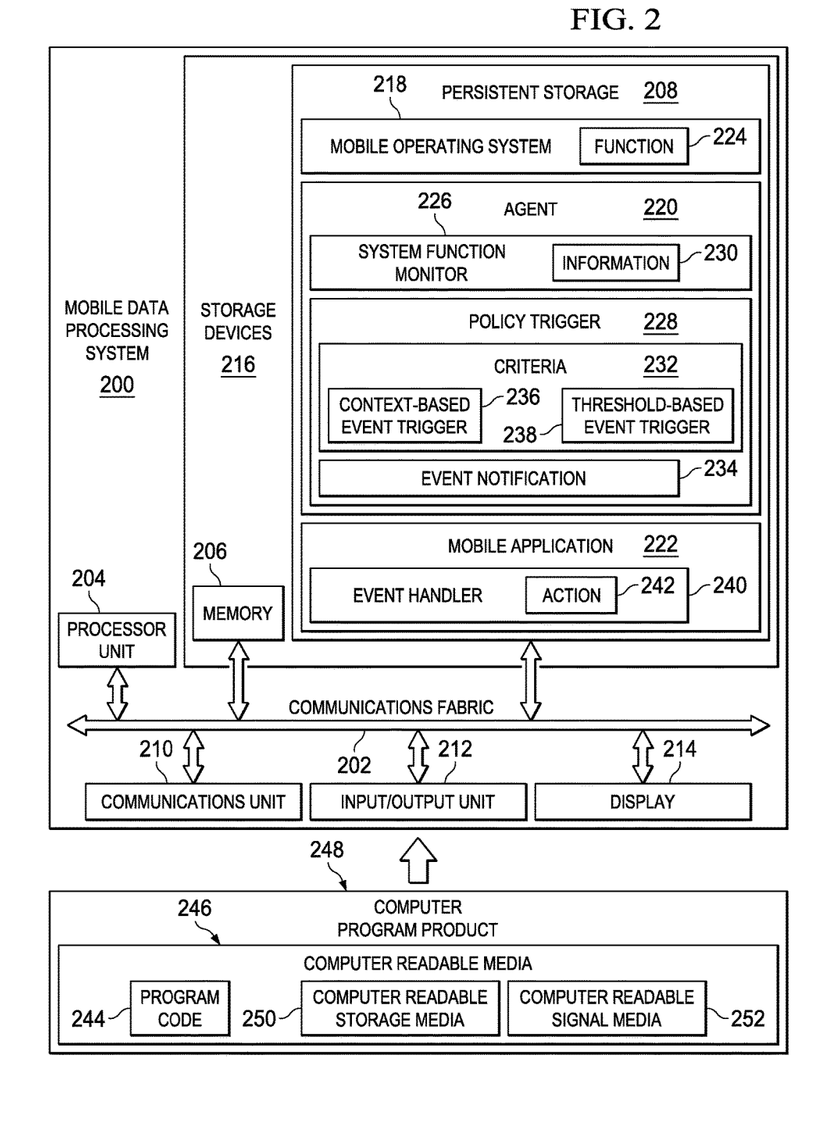
FIG. 2 is a diagram of a mobile data processing system in which illustrative embodiments may be implemented.

With reference now to FIG. 2, a diagram of a mobile data processing system is depicted in accordance with an illustrative embodiment. Mobile data processing system 200 is an example of a mobile device, such as client 110 in FIG. 1, in which computer readable program code or program instructions implementing processes of illustrative embodiments may be located. In this illustrative example, mobile data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores mobile operating system 218, agent 220, and mobile application 222. However, it should be noted that different illustrative embodiments may store more or less information in persistent storage 208 than illustrated. For example, different illustrative embodiments may combine two components into one component or may split a component into two or more components.

Mobile operating system (OS) 218 is system software that manages hardware and software resources of mobile data processing system 200 and provides common services for software applications, such as mobile application 222. Generally, software applications require an operating system to function. Mobile operating system 218 schedules tasks for efficient use of mobile data processing system 200 and also may include software for cost allocation of processor time, data storage, battery power, network connections, and the like. For hardware functions, such as, for example, input and output and memory allocation, mobile operating system 218 acts as an intermediary between mobile application 222 and system hardware, although the code of mobile application 222 is usually executed directly by the system hardware and frequently makes system calls to a corresponding operating system function, such as function 224, or is interrupted by it.

Function 224 is an operating system function of mobile operating system 218. Function 224 may be, for example, an I/O function, a storage function, a network function, an error function, or the like. In addition, function 224 corresponds to a set of one or more tasks or operations performed by mobile application 222. It should be noted that function 224 may represent a plurality of different operating system functions performed by mobile operating system 218.

Agent 220 is a software component residing and executing on mobile data processing system 200. Agent 220 may be, for example, an I/O agent, a storage agent, a network agent, an error agent, or the like. Agent 220 works autonomously and continuously in mobile data processing system 200 to perform system function monitoring and event handler context-based and/or threshold-based event trigger reporting. It should be noted that agent 220 may represent a plurality of different agents residing and executing on mobile data processing system 200.

In this example, agent 220 includes system function monitor 226 and policy trigger 228. Agent 220 utilizes system function monitor 226 to monitor function 224 of mobile operating system 218 and other system functions, which are not part of the operating system. For example, system function monitor 226 may monitor mouse click events in a user interface and the like. System function monitor 226 collects information 230 regarding function 224 and the other non-operating system functions while system function monitor 226 monitors function 224 and the other non-operating system functions. Further, system function monitor 226 passes information 230 to policy trigger 228 for analysis.

Policy trigger 228 includes criteria 232. Criteria 232 are a set of rules that when one or more of the rules are met, they trigger the sending of event notification 234 to event handler 240 of mobile application 222. In this example, criteria 232 include context-based event trigger 236 and threshold-based event trigger 238.

Context-based event trigger 236 represents a context-based event corresponding to mobile data processing system 200 that triggers the sending of event notification 234 to event handler 240. Examples of a context-based event trigger may include: time of day (i.e., an event that occurs outside a specified time period during the day (e.g., at 2:00 a.m. and not during 9:00 a.m. to 5:00 p.m. business hours); day of week (i.e., an event that occurs on a day not specified during the week (e.g., on Sunday and not during Monday through Friday of the work week); mobile device geographic location (i.e., an event that occurs at a geographic location not specified (e.g., at home and not at a specified business location); mobile device model/serial number (i.e., an event that occurs on a mobile device model/serial number not specified); mobile device operating system type/version (i.e., an event that occurs on a mobile device having an operating system type/version not specified); and the like. Other examples of a context-based event trigger may include application status, weather, and some external information provided by a service. It should be noted that context-based event trigger 236 may represent a plurality of different context-based event triggers.

Threshold-based event trigger 238 represents a threshold-based event corresponding to mobile data processing system 200 that triggers the sending of event notification 234 to event handler 240. Examples of a threshold-based event trigger may include: memory/storage usage (e.g., exceeding a specified maximum memory/storage usage threshold); processor usage (e.g., exceeding a specified maximum processor usage threshold); network signal strength/network type (e.g., falling below a specified minimum network signal strength threshold or using a particular network type, such as 4G, LTE, WiFi, et cetera); network request response times (e.g., falling below a specified minimum network request response time threshold); I/O request response times (e.g., falling below a specified minimum I/O request response time threshold); and the like. It should be noted that threshold-based event trigger 238 may represent a plurality of different threshold-based event triggers.

Event notification 234 notifies event handler 240 that context-based event trigger 236 and/or threshold-based event trigger 238 has been met or satisfied. Event handler 240 is custom code created by a developer of mobile application 232 and inserted into mobile application 232 by the developer to perform action 242 in response to event handler 240 receiving event notification 234 that context-based event trigger 236 and/or threshold-based event trigger 238 has been met or satisfied. In other words, action 242 represents what the developer wants to happen in response to an event that triggers a notification to event handler 240. Action 242 represents a set of one or more actions that event handler 240 may perform in response to receiving event notification 234. Examples of action 242 may include: disabling one or more components or features of mobile data processing system 200 suspected of causing a problem (e.g., disabling Bluetooth); increasing error logging levels to verbose, which typically is not done due to storage space limitations; and sending diagnostic information to a network server for analysis.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for mobile data processing system 200. The wireless communications link may utilize, for example, shortwave, high frequency, ultra high frequency, microwave, wireless fidelity (WiFi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for mobile data processing system 200.

Input/output unit 212 allows for the input and output of data with other devices that may be connected to mobile data processing system 200. For example, input/output unit 212 may provide a connection for user input through a keypad and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 244 is located in a functional form on computer readable media 246 that is selectively removable and may be loaded onto or transferred to mobile data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to mobile data processing system 200. In some instances, computer readable storage media 250 may not be removable from mobile data processing system 200.

Alternatively, program code 244 may be transferred to mobile data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within mobile data processing system 200. For instance, program code stored in a computer readable storage media in a data processing system may be downloaded over a network from the data processing system to mobile data processing system 200. The data processing system providing program code 244 may be a server computer, a client computer, or some other device capable of storing and transmitting program code 244.

The different components illustrated for mobile data processing system 200 are not meant to provide architectural limitations to the manner in which different embodiments may be implemented. The different illustrative embodiments may be implemented in a data processing system including components in addition to, or in place of, those illustrated for mobile data processing system 200. Other components shown in FIG. 2 can be varied from the illustrative examples shown. The different embodiments may be implemented using any hardware device or system capable of executing program code. As one example, mobile data processing system 200 may include organic components integrated with inorganic components and/or may be comprised entirely of organic components excluding a human being. For example, a storage device may be comprised of an organic semiconductor.

As another example, a computer readable storage device in mobile data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Mobile applications experience varying environmental and resource challenges, which produce unexpected errors or failures, in the field. Modifying the behavior of mobile applications is very difficult because existing mobile operating systems do not provide methods for mobile applications to receive notifications of context-based or threshold-based event triggers for system events. Illustrative embodiments provide a context sensitive issue framework to enable mobile application developers to modify the behavior of their mobile applications with context-based policies and triggers that exist entirely on mobile devices. Thus, illustrative embodiments benefit mobile applications because illustrative embodiments may proactively prevent mobile application crashes instead of reactively responding after a mobile application crash, which may cause loss of data and a negative experience for a user.

The context sensitive issue framework comprises a mobile application with an event handler and a set of one or more agents that reside and run on a mobile device. The mobile application interacts with policy trigger notifications from the set of agents and the set of agents interact with the mobile operating system of the mobile device to invoke the appropriate system calls. The set of agents may include, for example, an input/output (I/O) agent, a storage agent, a network agent, and an error agent. The I/O agent may, for example, monitor speed and performance for input/output. The storage agent may, for example, monitor storage usage. The network agent may, for example, monitor network functions, such as signal strength, connectivity, and the like. The error agent may, for example, monitor error activity. It should be noted that illustrative embodiments may add other agents as needed.

While running on a mobile device, a mobile application interacts with the set of agents. The mobile application registers each event handler with a corresponding agent having a policy trigger corresponding to a respective event handler. An event handler is custom code that a mobile application developer inserts into a mobile application to perform a specific set of one or more actions based on relevant notifications received from an agent that the event handler is registered with. Each agent includes an operating system function monitor and a policy trigger.

The agent applies the policy trigger to monitored operating system function information and notifies the mobile application of a context-based and/or threshold-based event trigger via the event handler. The policy trigger calls back to the corresponding event handler created by the mobile application developer. The event handler provides the developer with an ability to have a mobile application proactively react to a policy triggering event and gather additional context information regarding the event corresponding to the policy trigger. Illustrative embodiments pass this context information to the mobile application developer via programming hooks to allow the developer to handle the event with custom code (i.e., the event handler). Illustrative embodiments embed the context sensitive issue framework within mobile applications running on mobile devices, which differentiates illustrative embodiments from a service that is provided by a network server.

Figure 3:
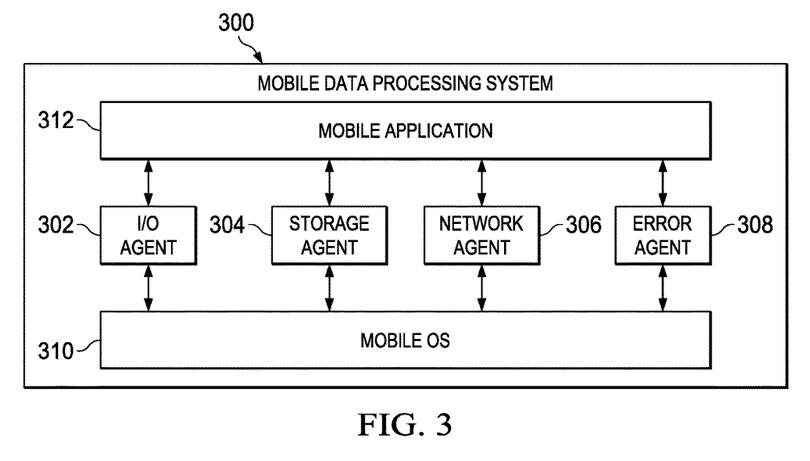
FIG. 3 is a diagram illustrating examples of different agents interacting with a mobile operating system and application in accordance with an illustrative embodiment.

With reference now to FIG. 3, a diagram illustrating examples of different agents interacting with a mobile operating system and application is depicted in accordance with an illustrative embodiment. In this example, the different agents are I/O agent 302, storage agent 304, network agent 306, and error agent 308. However, it should be noted that different illustrative embodiments may include more or fewer agents than illustrated.

Each of I/O agent 302, storage agent 304, network agent 306, and error agent 308 may be, for example, agent 220 in FIG. 2. In addition, I/O agent 302, storage agent 304, network agent 306, and error agent 308 reside and run on mobile data processing system 300. Mobile data processing system 300 may be, for example, mobile data processing system 200 in FIG. 2. Further, I/O agent 302, storage agent 304, network agent 306, and error agent 308 interact with mobile operating system 310 and mobile application 312. Mobile operating system 310 and mobile application 312 may be, for example, mobile operating system 218 and mobile application 222 in FIG. 2.

Figure 4:
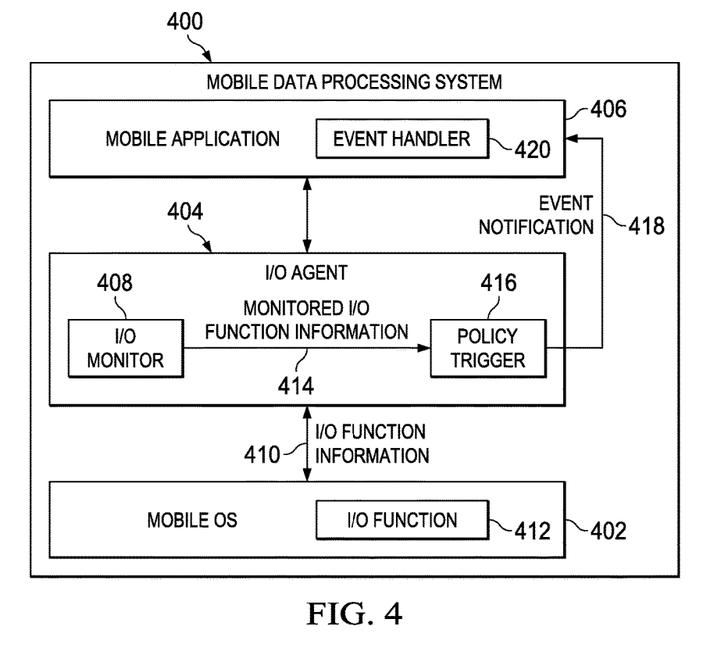
FIG. 4 is a diagram illustrating an example flow between an agent, mobile operating system, and mobile application in a mobile device in accordance with an illustrative embodiment.

With reference now to FIG. 4, a diagram illustrating an example flow between an agent, mobile operating system, and mobile application in a mobile device is depicted in accordance with an illustrative embodiment. Mobile data processing system 400 may be, for example, mobile data processing system 300 in FIG. 3. Mobile data processing system 400 includes mobile operating system 402, I/O agent 404, and mobile application 406, such as mobile operating system 310, I/O agent 302, and mobile application 312 in FIG. 3.

Mobile operating system 402, I/O agent 404, and mobile application 406 all reside and run on mobile data processing system 400. I/O agent 404 may monitor, for example, speed and performance for input and output. I/O agent 404 includes I/O monitor 408. I/O monitor 408 may be, for example, operating system function monitor 226 in FIG. 2. I/O monitor 408 tracks and processes I/O function information 410, which corresponds to I/O function 412 of mobile operating system 402. I/O function information 410 may be, for example, information 230 in FIG. 2. I/O function information 410 may indicate, for example, that too much disk traffic is currently occurring. I/O function 412 of mobile operating system 402 may be, for example, function 224 of mobile operating system 218 in FIG. 2.

I/O monitor 408 passes monitored I/O function information 414 to policy trigger 416, which is listening for the criteria, such as context-based event triggers and threshold-based event triggers, that trigger the sending of event notification 418 to corresponding event handler 420. Using the example above, a threshold-based event trigger was met (i.e., a specified maximum disk traffic threshold was exceeded). Policy trigger 416 may be, for example, policy trigger 228 in FIG. 2, which contains criteria 232, context-based event trigger 236, and threshold-based event trigger 238. Event notification 418 may be, for example, event notification 234 in FIG. 2.

Mobile application 406 registers event handler 420 with I/O agent 404 so that I/O agent 404 is aware of event handler 420 to invoke an action. Event handler 420 may be, for example, event handler 240 in FIG. 2. Event handler 420 performs a set of one or more actions, such as action 242 in FIG. 2, to modify a behavior of mobile application 406 based on the threshold-based event trigger that triggered the sending of event notification 418 to event handler 420. The set of actions may be, for example, reducing or throttling I/O usage, increasing event logging levels, and any other action specified by the developer in the custom code of event handler 420.

As another example, a storage agent may monitor the overall storage usage of mobile data processing system 400. The storage agent may be, for example, storage agent 304 in FIG. 3. If mobile data processing system 400 is running low on storage, then the storage agent may send a storage space threshold-based event notification to a corresponding event handler of mobile application 406 to warn of low storage. In response, the corresponding event handler may perform an action to reduce the amount of local storage used by mobile application 406 to reduce a chance of application crash, error, or mobile operating system 402 killing mobile application 406. Alternatively, the corresponding event handler may present a user of mobile data processing system 400 with a warning dialog and allow the user to selectively free up local storage space. Further, the corresponding event handler also may alter the behavior of mobile application 406 to reduce or eliminate writing new data to local storage until the low storage situation is resolved. Furthermore, the storage agent may provide another notification to the corresponding event handler when the storage is back to normal (i.e., above the low storage threshold level) and the corresponding event handler allows mobile application 406 to return to its previous local storage behavior.

As a further example, a network agent of mobile data processing system 400 may monitor the number of network packets dropped via WiFi. The network agent may be, for example, network agent 306 in FIG. 3. Mobile application 406 may register a criterion with the network agent to detect when the percentage of dropped network packets exceeds a specified maximum percentage of dropped network packets threshold. This registered criterion can trigger the sending of an associated event notification to a corresponding event handler of mobile application 406 when the specified threshold is exceeded. In response, the corresponding event handler performs an action, such as, for example, displaying a recommendation to a user of mobile data processing system 400 to switch from WiFi to cellular data or to connect to another WiFi network with a stronger signal.

Figure 5:
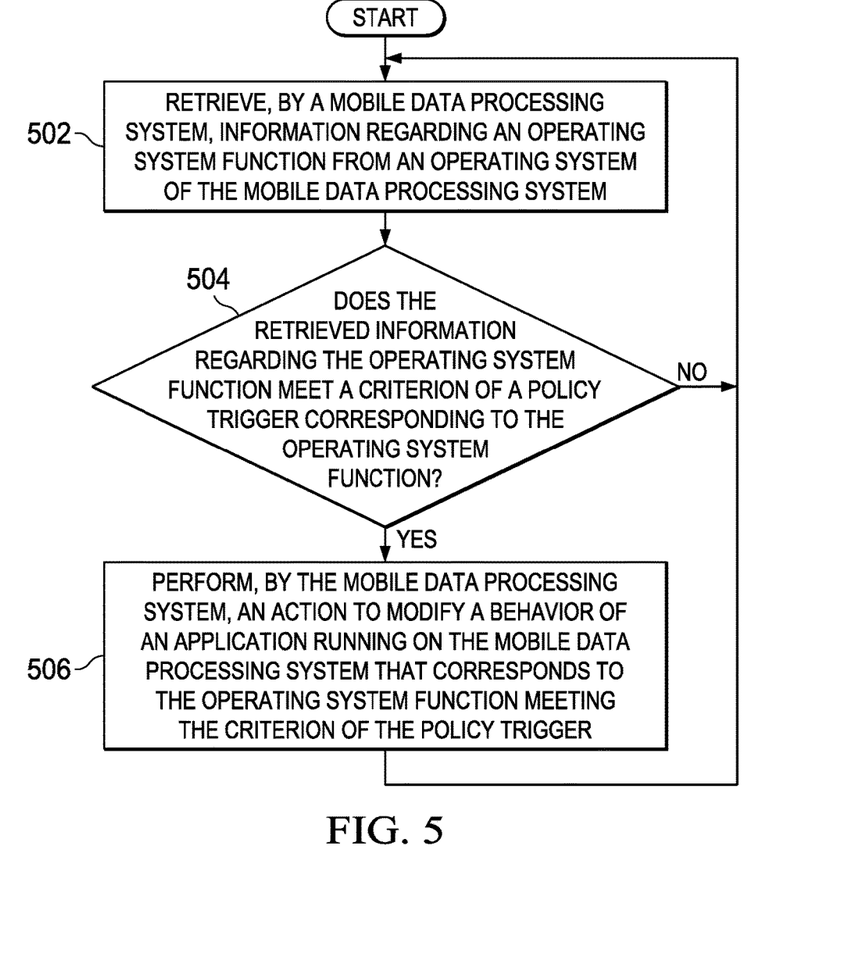
FIG. 5 is a flowchart illustrating a process for modifying a behavior of a mobile application running on a mobile device in accordance with an illustrative embodiment.

With reference now to FIG. 5, a flowchart illustrating a process for modifying a behavior of a mobile application running on a mobile device is shown in accordance with an illustrative embodiment. The process shown in FIG. 5 may be implemented in a mobile data processing system, such as, for example, client 110 in FIG. 1, mobile data processing system 200 in FIG. 2, and mobile data processing system 400 in FIG. 4.

The process begins when the mobile data processing system retrieves information regarding an operating system function from an operating system of the data processing system (step 502). The information regarding the operating system function of the operating system may be, for example, I/O function information 410 regarding I/O function 412 of mobile operating system 402 in FIG. 4. Afterward, the mobile data processing system makes a determination as to whether the retrieved information regarding the operating system function meets a criterion of a policy trigger corresponding to the operating system function (step 504). The criterion of the policy trigger corresponding to the operating system function may be, for example, criteria 232 of policy trigger 228 in FIG. 2.

If the mobile data processing system determines that the retrieved information regarding the operating system function does not meet a criterion of the policy trigger corresponding to the operating system function, no output of step 504, then the process returns to step 502 where the mobile data processing system continues to retrieve the information. If the mobile data processing system determines that the retrieved information regarding the operating system function does meet a criterion of the policy trigger corresponding to the operating system function, yes output of step 504, then the mobile data processing system performs an action to modify a behavior of an application running on the mobile data processing system that corresponds to the operating system function meeting the criterion of the policy trigger (step 506). The action may be, for example, action 242 in FIG. 2. The application may be, for example, mobile application 222 in FIG. 2 or mobile application 406 in FIG. 4. Thereafter, the process returns to step 502 where the mobile data processing system continues to retrieve the information.

Figure 6:
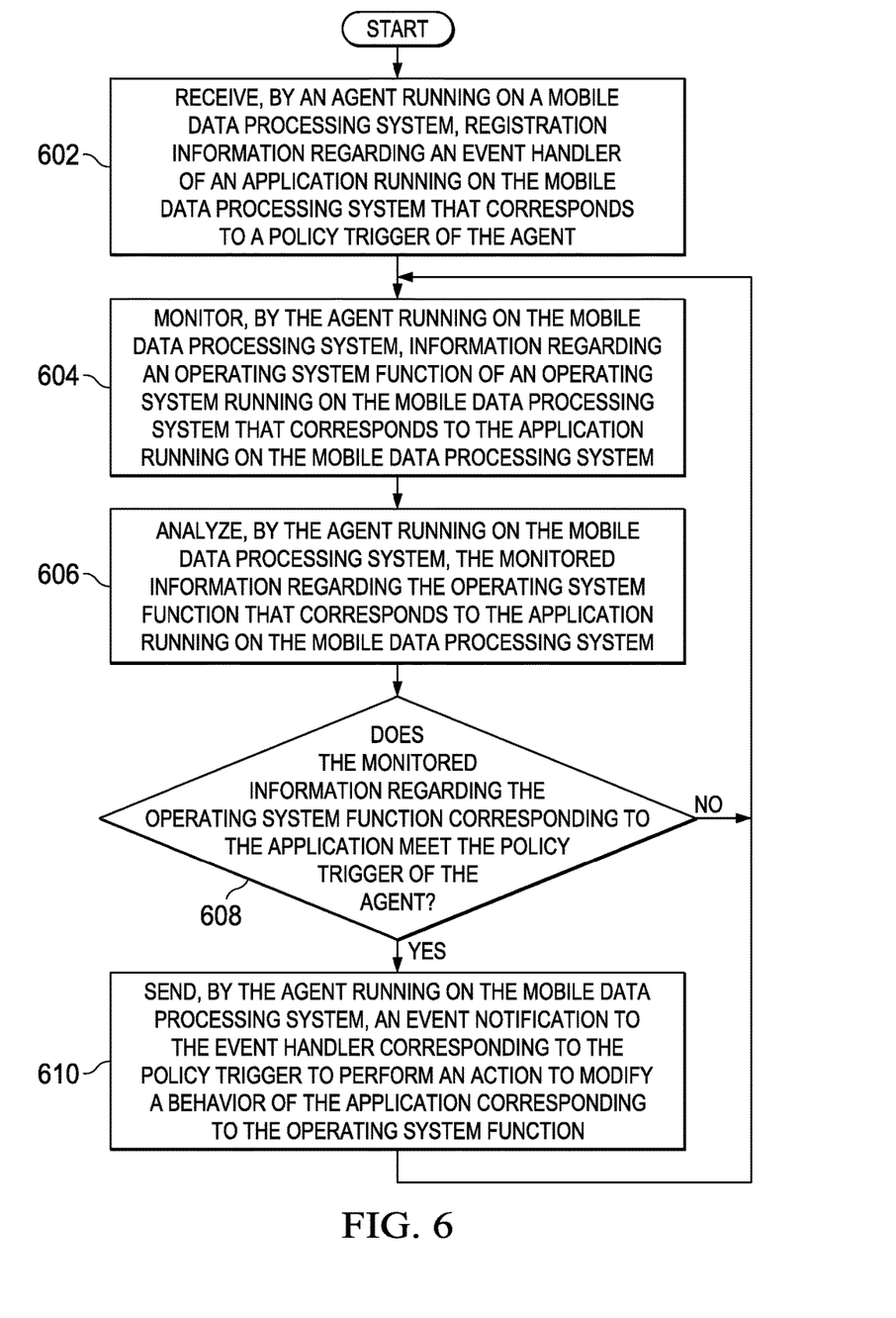
FIG. 6 is a flowchart illustrating a process for an agent in accordance with an illustrative embodiment.

With reference now to FIG. 6, a flowchart illustrating a process for an agent is shown in accordance with an illustrative embodiment. The process shown in FIG. 6 may be implemented in a mobile data processing system, such as, for example, client 110 in FIG. 1, mobile data processing system 200 in FIG. 2, and mobile data processing system 400 in FIG. 4.

The process begins when an agent running on the mobile data processing system receives registration information regarding an event handler of an application running on the mobile data processing system that corresponds to a policy trigger of the agent (step 602). The agent may be, for example, I/O agent 404 in FIG. 4. The event handler of the application may be, for example, event handler 420 of mobile application 406 in FIG. 4. The policy trigger that corresponds to the event handler may be, for example, policy trigger 416 in FIG. 4.

The agent running on the mobile data processing system monitors information regarding an operating system function of an operating system running on the mobile data processing system that corresponds to the application running on the mobile data processing system (step 604). The operating system function of the operating system may be, for example, I/O function 412 of mobile operating system 402 in FIG. 4. The information being monitored may be, for example, I/O function information 410 in FIG. 4. In addition, the agent running on the mobile data processing system analyzes the monitored information regarding the operating system function that corresponds to the application running on the mobile data processing system (step 606).

Subsequently, the agent running on the mobile data processing system makes a determination as to whether the monitored information regarding the operating system function corresponding to the application meets the policy trigger of the agent (step 608). If the agent running on the mobile data processing system determines that the monitored information regarding the operating system function corresponding to the application does not meet the policy trigger of the agent, no output of step 608, then the process returns to step 604 where the agent continues to monitor the information. If the agent running on the mobile data processing system determines that the monitored information regarding the operating system function corresponding to the application does meet the policy trigger of the agent, yes output of step 608, then the agent running on the mobile data processing system sends an event notification to the event handler corresponding to the policy trigger to perform an action to modify a behavior of the application corresponding to the operating system function (step 610). The event notification may be, for example, event notification 418 in FIG. 4. The action may be, for example, action 242 in FIG. 2. Thereafter, the process returns to step 604 where the agent running on the mobile data processing system continues to monitor the information.

Figure 7:
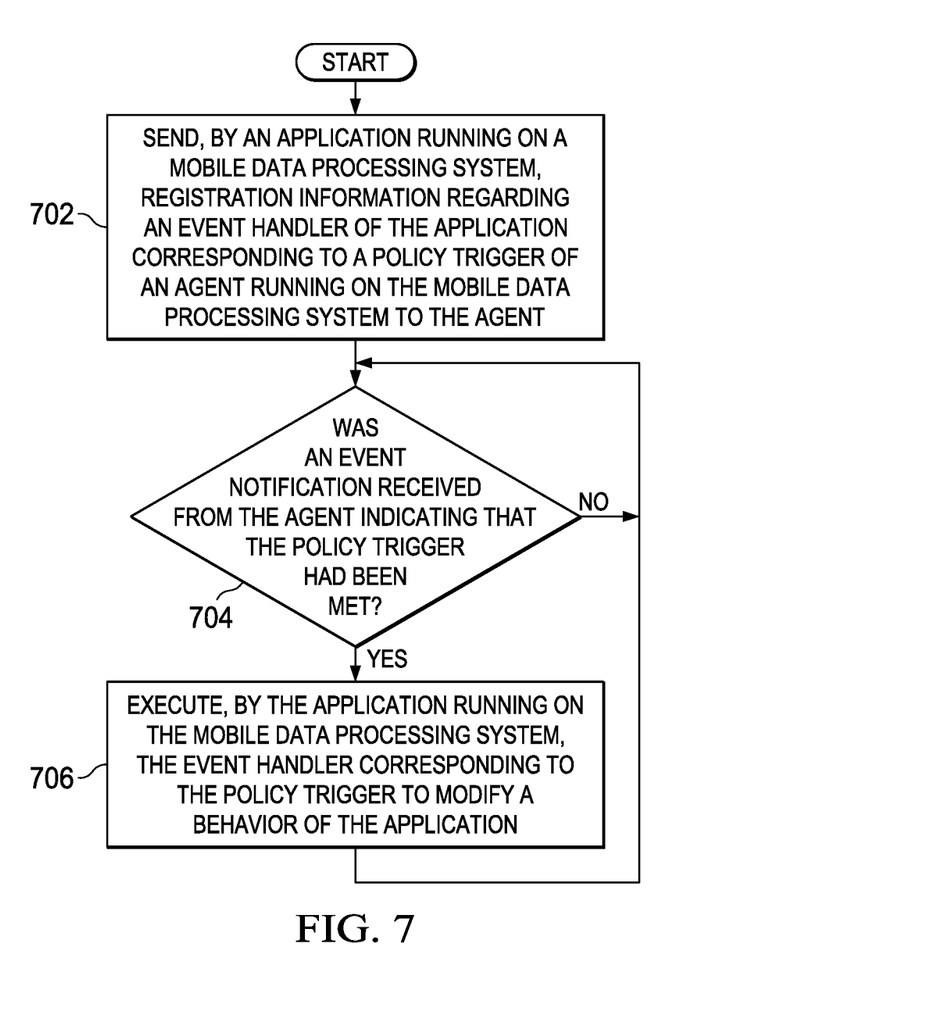
FIG. 7 is a flowchart illustrating a process for a mobile application in accordance with an illustrative embodiment.

With reference now to FIG. 7, a flowchart illustrating a process for a mobile application is shown in accordance with an illustrative embodiment. The process shown in FIG. 7 may be implemented in a mobile data processing system, such as, for example, client 110 in FIG. 1, mobile data processing system 200 in FIG. 2, and mobile data processing system 400 in FIG. 4.

The process begins when an application running on the mobile data processing system sends registration information regarding an event handler of the application corresponding to a policy trigger of an agent running on the mobile data processing system to the agent (step 702). The application may be, for example, mobile application 406 in FIG. 4. The event handler may be, for example, event handler 420 in FIG. 4. The policy trigger that corresponds to the event handler may be, for example, policy trigger 416 in FIG. 4.

The application running on the mobile data processing system makes a determination as to whether an event notification was received from the agent indicating that the policy trigger had been met (step 704). If the application running on the mobile data processing system determines that an event notification was not received from the agent indicating that the policy trigger had been met, no output of step 704, then the process returns to step 704 where the application continues to wait for an event notification. If the application running on the mobile data processing system determines that an event notification was received from the agent indicating that the policy trigger had been met, yes output of step 704, then the application running on the mobile data processing system executes the event handler corresponding to the policy trigger to modify a behavior of the application (step 706). The received event notification may be, for example, event notification 418 in FIG. 4. Thereafter, the process returns to step 704 where the application continues to wait for another event notification.

Thus, illustrative embodiments of the present invention provide a computer-implemented method, mobile data processing system, and computer program product for modifying a behavior of a mobile application running on a mobile device using an event handler that receives relevant context-based and threshold-based event trigger notifications from a corresponding agent running on the mobile device. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for modifying a behavior of a mobile application running on a mobile data processing system, the computer-implemented method comprising:

retrieving, by the mobile data processing system, information regarding a system function of a mobile operating system running on the mobile data processing system;

determining, by the mobile data processing system, whether the information regarding the system function of the mobile operating system meets a criterion of a policy trigger corresponding to the system function of the mobile operating system; and responsive to the mobile data processing system determining that the information regarding the system function of the mobile operating system does meet a criterion of the policy trigger corresponding to the system function, performing, by the mobile data processing system, an action to modify the behavior of the mobile application running on the mobile data processing system that corresponds to the system function of the mobile operating system meeting the criterion of the policy trigger, wherein the mobile data processing system utilizes an agent of the mobile data processing system to retrieve and monitor the information, wherein the agent comprises (i) an operating system function monitor that monitors the system function of the mobile operating system running on the mobile data processing system and (ii) the policy trigger.

2. The computer-implemented method of claim 1, wherein the mobile data processing system utilizes a plurality of agents of the mobile data processing system to retrieve and monitor the information.

3. The computer-implemented method of claim 2, wherein each agent of the plurality of agents monitors a particular system function of the mobile operating system, and wherein the particular system function of the mobile operating system is selected from a group consisting of an I/O function performed by the mobile data processing system, a storage function performed by the mobile data processing system, a network function performed by the mobile data processing system, and an error function performed by the mobile data processing system.

4. The computer-implemented method of claim 1, wherein the action to modify the behavior of the mobile application is a set of one or more actions selected from a group of actions consisting of providing a notification to a user of the mobile data processing system, reducing usage of one or more resources of the mobile data processing system, altering data transmission levels of the mobile data processing system, and providing a recommendation to the user of the mobile data processing system to utilize an alternate resource.

5. The computer-implemented method of claim 1, wherein the mobile data processing system utilizes an event handler of the mobile application to perform the action, wherein the event handler is custom code inserted into the mobile application that is configured to perform a set of one or more actions based on a notification received from the agent that the event handler is registered with.

6. The computer-implemented method of claim 5, wherein the mobile application registers the event handler with the agent that contains the policy trigger corresponding to the system function.

7. The computer-implemented method of claim 6, wherein the operating system function monitor passes the information regarding the system function to the policy trigger for analysis, and wherein the policy trigger of the agent sends an event notification to the event handler in response to at least one of a context-based event trigger and a threshold-based event trigger being met.

8. The computer-implemented method of claim 7, wherein the context-based event trigger is one of a group consisting of time of day, day of week, mobile device geographic location, mobile device model, mobile device operating system type, application status, weather, and some external information provided by a service.

9. The computer-implemented method of claim 7, wherein the threshold-based event trigger is one of a group consisting of storage usage, processor usage, network signal strength, network type, network request response times, and I/O request response times.

10. The computer-implemented method of claim 1, wherein the system function corresponds to a set of tasks being performed by the mobile application.

11. A mobile data processing system for modifying a behavior of a mobile application running on the mobile data processing system, the mobile data processing system comprising:

a bus system;
a storage device connected to the bus system, wherein the storage device stores program instructions; and
a processor connected to the bus system, wherein the processor executes the program instructions to:
retrieve information regarding a system function of the mobile data processing system;
determine whether the information regarding the system function meets a criterion of a policy trigger corresponding to the system function; and
perform an action to modify the behavior of the mobile application running on the mobile data processing system that corresponds to the system function meeting the criterion of the policy trigger in response to determining that the information regarding the system function does meet a criterion of the policy trigger corresponding to the system function, wherein the mobile data processing system utilizes a plurality of agents of the mobile data processing system to retrieve and monitor the information.

12. The mobile data processing system of claim 11, wherein each agent of the plurality of agents monitors a particular system function of the mobile operating system, and wherein the particular system function of the mobile operating system is selected from a group consisting of an I/O function performed by the mobile data processing system, a storage function performed by the mobile data processing system, a network function performed by the mobile data processing system, and an error function performed by the mobile data processing system.

13. A computer program product for modifying a behavior of a mobile application running on a mobile data processing system, the computer program product comprising a computer readable storage medium having program instructions embodied therewith, the program instructions executable by the mobile data processing system to cause the mobile data processing system to perform a method comprising:

retrieving, by the mobile data processing system, information regarding a system function of a mobile operating system running on the mobile data processing system;
determining, by the mobile data processing system, whether the information regarding the system function of the mobile operating system meets a criterion of a policy trigger corresponding to the system function of the mobile operating system; and
responsive to the mobile data processing system determining that the information regarding the system function of the mobile operating system does meet a criterion of the policy trigger corresponding to the system function of the mobile operating system, performing, by the mobile data processing system, an action to modify the behavior of the mobile application running on the mobile data processing system that corresponds to the system function meeting the criterion of the policy trigger, wherein the mobile data processing system utilizes an agent of the mobile data processing system to retrieve and monitor the information, wherein the agent comprises (i) an operating system function monitor that monitors the system function of the mobile operating system running on the mobile data processing system and (ii) the policy trigger.

14. The computer program product of claim 13, wherein the mobile data processing system utilizes a plurality of agents of the mobile data processing system to retrieve and monitor the information.

15. The computer program product of claim 14, wherein each agent of the plurality of agents monitors a particular system function of the mobile operating system, and wherein the particular system function of the mobile operating system is selected from a group consisting of an I/O function performed by the mobile data processing system, a storage function performed by the mobile data processing system, a network function performed by the mobile data processing system, and an error function performed by the mobile data processing system.

16. The computer program product of claim 13, wherein the action to modify the behavior of the mobile application is a set of one or more actions selected from a group of actions consisting of providing a notification to a user of the mobile data processing system, reducing usage of one or more resources of the mobile data processing system, altering data transmission levels of the mobile data processing system, and providing a recommendation to the user of the mobile data processing system to utilize an alternate resource.

17. The computer program product of claim 13, wherein the mobile data processing system utilizes an event handler of the mobile application to perform the action, wherein the event handler is custom code inserted into the mobile application that is configured to perform a set of one or more actions based on a notification received from the agent that the event handler is registered with.

18. The computer program product of claim 17, wherein the mobile application registers the event handler with the agent that contains the policy trigger corresponding to the system function.

19. The computer program product of claim 18, wherein the operating system function monitor passes the information regarding the system function to the policy trigger for analysis, and wherein the policy trigger of the agent sends an event notification to the event handler in response to at least one of a context-based event trigger and a threshold-based event trigger being met.

\* \* \* \* \*